United States Patent
Yousefi et al.

(10) Patent No.: US 11,876,293 B1
(45) Date of Patent: Jan. 16, 2024

(54) ARRAY WALL SLOT ANTENNA FOR PHASED ARRAY CALIBRATION

(71) Applicant: Amazon Technologies, Inc., Seattle, WA (US)

(72) Inventors: Tara Yousefi, Bellevue, WA (US); Alireza Mahanfar, Kirkland, WA (US); Peter James Hetzel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/981,290

(22) Filed: Nov. 4, 2022

Related U.S. Application Data

(62) Division of application No. 16/928,270, filed on Jul. 14, 2020, now Pat. No. 11,527,833.

(51) Int. Cl.
| | |
|---|---|
| *H01Q 13/10* | (2006.01) |
| *H04B 17/21* | (2015.01) |
| *H01Q 5/357* | (2015.01) |
| *H04B 17/11* | (2015.01) |

(52) U.S. Cl.
CPC .......... *H01Q 13/106* (2013.01); *H01Q 5/357* (2015.01); *H04B 17/11* (2015.01); *H04B 17/21* (2015.01)

(58) Field of Classification Search
CPC ...... H01Q 13/106; H01Q 5/357; H04B 17/11; H04B 17/21
See application file for complete search history.

(56) References Cited

U.S. PATENT DOCUMENTS

| | | | |
|---|---|---|---|
| 5,160,936 | A | 11/1992 | Braun |
| 7,427,967 | B2 | 9/2008 | Hughes |
| 11,527,833 | B1* | 12/2022 | Yousefi .................. H04B 17/21 |
| 2015/0084814 | A1 | 3/2015 | Rojanski |
| 2016/0294066 | A1 | 10/2016 | Djerafi |
| 2018/0183150 | A1* | 6/2018 | Sienkiewicz ............ H01Q 1/38 |
| 2019/0326678 | A1* | 10/2019 | Uchimura ............ H01Q 9/0414 |
| 2019/0379464 | A1* | 12/2019 | Ng .......................... H04B 17/11 |
| 2020/0021008 | A1 | 1/2020 | Yong |
| 2020/0053870 | A1 | 2/2020 | Miers |
| 2020/0280129 | A1 | 9/2020 | Miers |

FOREIGN PATENT DOCUMENTS

| | | |
|---|---|---|
| CN | 111834747 A | 10/2020 |
| EP | 2551959 B1 | 4/2014 |

* cited by examiner

*Primary Examiner* — Seokjin Kim
(74) *Attorney, Agent, or Firm* — Lowenstein Sandler LLP

(57) ABSTRACT

Technologies directed to a slot antenna as a calibration antenna for a phased array antenna are described. A communication system includes an antenna array with a first antenna module with a plurality of antenna elements and a conductive wall structure isolating each of the plurality of antenna elements. The conductive wall structure includes a portion separating a first antenna element and a second antenna element of the plurality of antenna elements. The portion includes a slot antenna.

20 Claims, 11 Drawing Sheets

ARRAY WALL SLOT ANTENNA FOR PHASED ARRAY CALIBRATION

RELATED APPLICATIONS

This application is a divisional application of U.S. patent application Ser. No. 16/928,270, filed Jul. 14, 2020, the entire contents of which are incorporated by reference.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
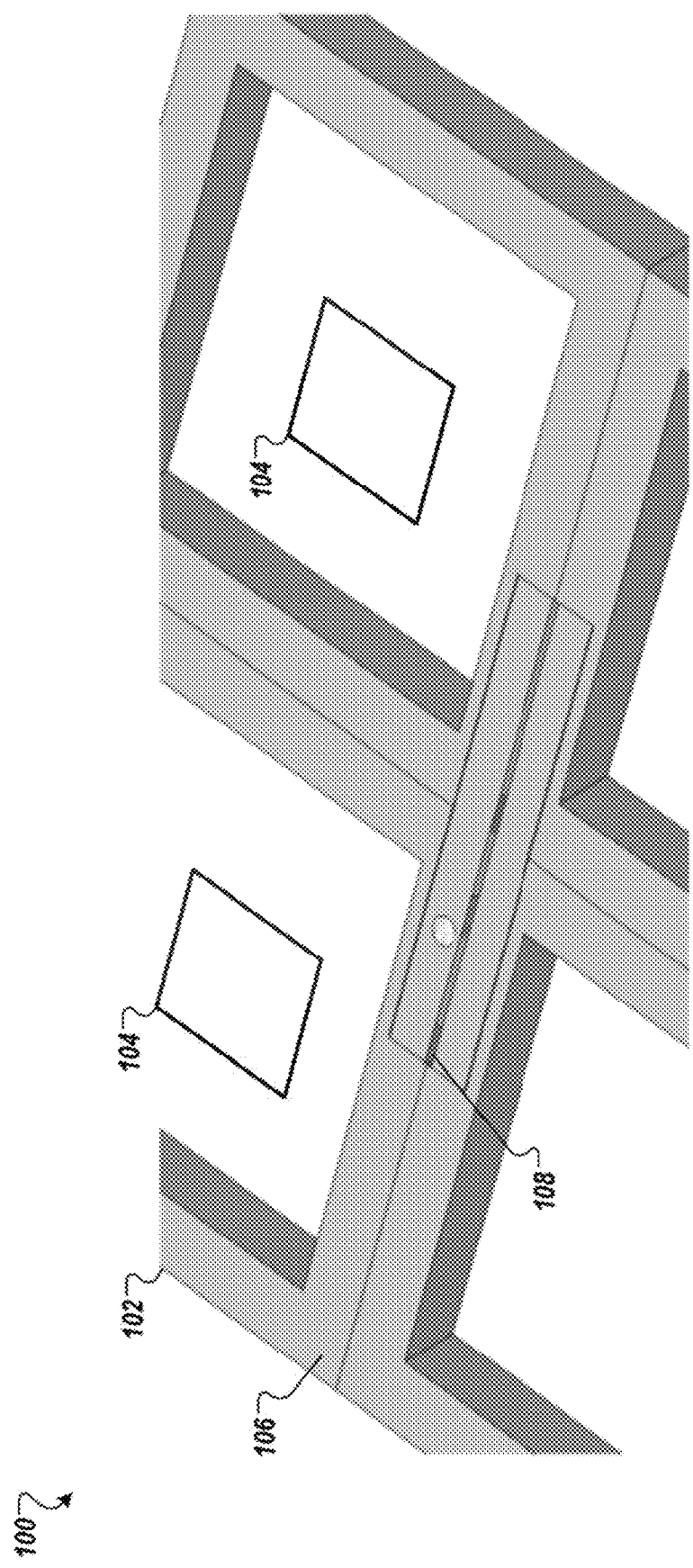
FIG. 1A illustrates an antenna structure with a phased array antenna with a set of antenna elements that are each separated by a wall structure including a slot antenna according to one embodiment.

Technologies directed to a slot antenna in an array wall for a phased array antenna are described. Described herein are slot antenna designs for calibrating a phased array antenna. A conventional phased array antenna includes antenna elements. The conventional phased array antenna operates to form beams (e.g., of electromagnetic radiation) and steer the beams by relying on constructive and destructive interference of electromagnetic waves transmitted by each individual antenna element. An important part in the design and performance of a phased array antenna is the ability to calibrate the phased array antenna. A periodic in-orbit calibration can play an important role in ensuring continuous performance of a phased array antenna. There are a number of factors that can cause degradation of performance of active phased array antennas over time. In some cases, an active phased array antenna is airborne and/or satellite-borne and can contain a large number of elements and a ground-based calibration may not be a practical means of calibration. In such cases, an auxiliary calibration antenna could be used to periodically gather data from antenna elements and compare that data to initial data that was obtained and stored as reference data (also referred to as a gold reference). Any deviation from the golden reference would requiring tuning at least a phase and gain amplitude of various components of the antenna element to ensure that degradations in gain, scan, side-lobe level, and antenna performs does not happen.

The calibration antenna can serve as an additional antenna within the phased array antenna to gather data from antenna elements of the phased array antenna. The data can be compared to initial data that was obtained and stored as reference data (also referred to as a golden reference) before the phased array antenna is launched and deployed in orbit. However, the choice of the type of antenna to use as the calibration antenna can present challenges due to a number of design constraints. Some solutions could include integrating an antenna such as a monopole probe antenna, a helical antenna, a patch antenna, or the like within the antenna array. However, such an embedded antenna could affect antenna performance.

Aspects of the present disclosure overcome the deficiencies of other calibration antennas by providing an antenna that can use the geometry of the antenna array itself without adding an additional element in order to perform calibration without making significant changes to the antenna array. An antenna array can include metal or conducting walls in which to include a slot antenna for calibration. Adding metals walls between antenna elements (e.g., to physically separate and/or electrically isolate them) can increase antenna efficiency, improve scan performance, and reduce the impact of surface waves and coupling between antenna elements of the antenna array. Further, including a metal wall structure (or a conductive wall structure) can reduce mutual coupling between closely packed antenna elements. The benefits of including a metallic (or conductive) wall structure in an antenna array is not limited to patch antenna elements, but can also benefit performance of other types of arrays including slot arrays. As such, implementing a calibration antenna within the metallic walls can be used for different types of arrays and is not required to be limited to a certain type of array.

In order to use the conductive walls that are already available in the array geometry to implement a slot antenna for in-orbit calibration, the slot antenna should fit within the limit space (of the conductive wall), and should have good antenna performance at the same frequency (e.g., 28.5 GHz to 29.1 GHz) as the array. Aspects of the present disclosure describe an isolated slot antenna that can be designed to have a resonance frequency in the required frequency band and have dimensions that can be practically manufactured and be limited to the conductive walls of the antenna array.

FIG. 1A illustrates an antenna structure 100 with a phased array antenna 102 with a set of antenna elements 104 that are each separated by a wall structure 106 including a slot antenna 108 according to one embodiment. Each antenna element of the set of antenna elements 104 is separated from each adjacent antenna element 104 by a wall or a wall structure. The phased array antenna 102 can be coupled to first radio frequency front-end (RFFE) circuitry that is coupled to a first RF module circuit that operates at a frequency (e.g., between 28.5 GHz and 29.1 GHz) within a bandwidth. The first RFFE circuitry is coupled to the set of antenna elements 104. Alternatively, the set of antenna elements 104 can be coupled to one or more radios via one or more separate RFFE circuitry. The first RF module circuit can include a baseband processor. The support structure can be a circuit board, such as a printed circuit board (PCB), or other structure upon which the antenna elements can be positioned. The antenna structure 100 includes a ground plane and the set of antenna elements 104. In particular, the antenna elements 104 are each separated from the ground plane by a first distance. For example, a first antenna element 104 and a second antenna element 104 are located in a first plane that is separated from the ground plane by the first distance. A dielectric material can fill the space between the ground plane and the first plane. The antenna elements 104 can be located on the dielectric material opposite from the ground plane. Adjacent antenna elements 104 are separated from each other by a second distance. The set of antenna elements 104 can be arranged on a grid pattern, such as a square grid, a rectangular grid, or other repeating pattern. A conductive material that forms the wall structure 106 (e.g., a metal or metallic wall) is located in the first plane between each antenna element 104. A portion of the conductive material is located between the first antenna element and the second antenna element. The portion of the conductive material has the slot that forms a slot antenna 108 and a radio frequency (RF) feed point is located at the slot antenna. A portion of the conductive material defines the slot antenna 108. The slot antenna 108 is rectangular in shape and radiates energy at the edges of the rectangle (e.g., rectangular shape). The energy that is radiated can be electromagnetic energy such as in the RF portion, microwave portion, or other portion of the electromagnetic spectrum. The portion of the conductive material electrically isolates the first antenna element and the second antenna element. An RF feed point can be located at the slot and the slot antenna 108 radiates electromagnetic energy. The RF feed point can be located at a center of the slot, at either end of the slot, or anywhere along the slot. The slot antenna 108 radiates electromagnetic energy to calibrate the set of antenna elements 104. In some embodiments, the slot antenna 108 can radiate energy to calibrate the set of antenna elements 104 and a second set of antenna elements, for example, when the set of antenna elements 104 is part of a first antenna module, the second set of antenna elements is part of a second antenna module that is coupled to the first antenna module and identical to the first antenna module, and the antenna structure 100 includes a set of antenna modules identical to the first antenna module.

The dielectric material can be characterized by a permittivity, such as a relative permittivity (Er) or a dielectric constant. In one embodiment, the relative permittivity of the dielectric material is about 7.8. In other embodiments, the dielectric material can be any other suitable dielectric material with a different relative permittivity. In some cases, the choice of dielectric material can depend on dimensions of the slot antenna, such as length, width, depth, and the like.

Although the antenna elements 104 are represented in the figures as square elements any size or type of antenna can be located at the corresponding square location. In some cases, the antenna elements are square-shape patch antenna elements. In other embodiments, the antenna elements can be other shapes, such as rectangular, circular, or other suitable shape. In another embodiment, the antenna elements are slots in material as slot elements (slot antennas). Alternatively, the elements can be other types of antenna element types, such as microstrip antennas, planar inverted-F antennas (PIFAs), or the like, that are used in phased array antennas. Alternatively, the elements are not necessarily part of a phased array antenna, but a group of elements that can be used for other wireless communications than beam steering.

In one embodiment, the slot in the conductive material forms a rectangular shape and includes a first edge, a second edge parallel to the first edge, a third edge perpendicular to the first edge, and a fourth edge parallel to the third edge. The second edge is separated from the first edge by a third distance and the fourth edge is separated from the third edge by a fourth distance. The first edge, the second edge, the third edge, and the fourth edge form the slot and are sides of a rectangular cutout in the conductive element that radiates electromagnetic energy. The first edge and the second edge have a first length and the third edge and the fourth edge have a second length. The second length can be substantially less than the first length to form an elongated or thin rectangle. The slot in the conductive material is a slot antenna which is located in the conductive material. Although depicted as a rectangular slot, in other embodiments, the slot antenna can have a different shape, such as being ellipsoidal, effectively linear, square, or the like. Although the slot is a slot antenna, it can be designed to radiate substantially or effectively as a dipole antenna. In other words the slot antenna can be designed such that its radiation pattern is similar to a radiation pattern of a dipole antenna.

In one embodiment, a center of the slot antenna is located between the first antenna element and the second antenna element. In another embodiment, a third antenna element is adjacent to the first antenna element and a fourth antenna element is adjacent to the third antenna element and the second antenna element, and a center of the slot antenna is located between the first antenna element, the second antenna element, the third antenna element, and the fourth antenna element. In further embodiments, the center of the slot antenna 108 is located equidistantly from the center of the first antenna element, the center of the second antenna element, the center of the third antenna element, and the center of fourth antenna element. In other words, the center of the slot antenna 108 is located at a same distance from a center of each of the first antenna element 104, the second antenna element 104, the third antenna element 104, and the fourth antenna element 104.

In some embodiments, the antenna structure 100 is a phased array antenna and is part of a satellite, and the slot antenna 108 operates as a calibration antenna for in-orbit calibration of the phased array antenna. In other embodiments, the antenna structure can be part of a communication system or wireless device.

Figure 1B:
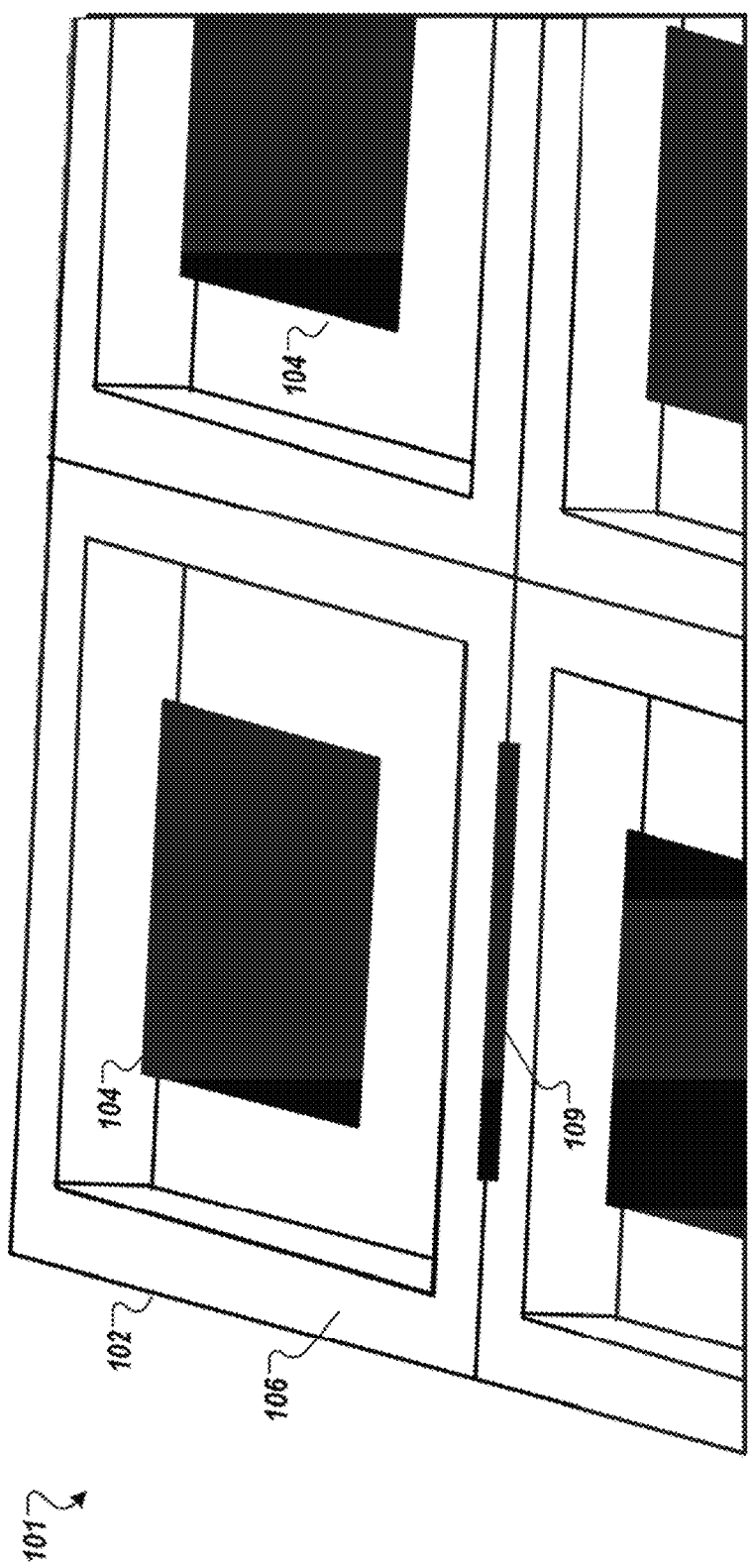
FIG. 1B illustrates an antenna structure with a phased array antenna with a set of antenna elements that are each separated by a wall structure including a slot antenna according to one embodiment.

FIG. 1B illustrates an antenna structure 101 with a phased array antenna 102 with a set of antenna elements 104 that are each separated by a wall structure 106 including a slot antenna 108b according to one embodiment. Although not all components of the antenna structure 101 are shown, the antenna structure 101 is the same or similar to the antenna structure 100 of FIG. 1A except as noted. In the depicted embodiment, a center of the slot antenna 109 is located between a first antenna element and a second antenna element.

Figure 2A:
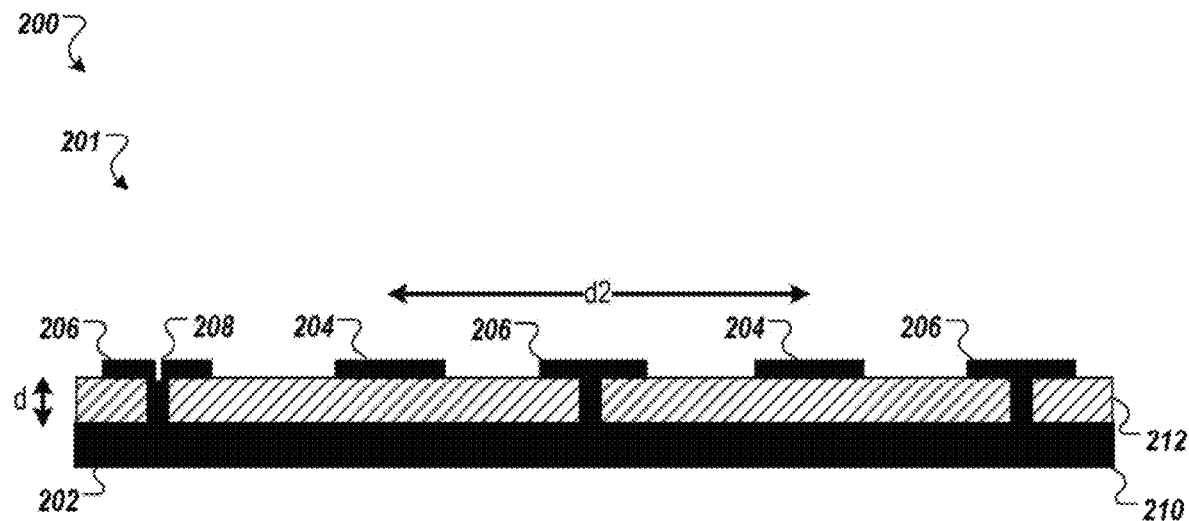
FIG. 2A illustrates a cross sectional view of an antenna structure with a phased array antenna with a set of antenna elements that are each separated by a wall structure including a slot antenna according to one embodiment.

FIG. 2A illustrates a cross sectional view 201 of an antenna structure 200 with a phased array antenna 202 with a set of antenna elements 204 that are each separated by a wall structure 206 including a slot antenna 208 according to one embodiment. Although not all components of the antenna structure 200 are shown, the antenna structure 200 is the same or similar to the antenna structure 100 of FIG. 1A as noted by similar reference numbers. The set of antenna elements 204 can be organized as a grid. The grid has an inter-element spacing of the second distance first distance (d2) between each of the set of antenna elements 204. That is, an inter-element spacing value is equal to the second distance. Each of the set of antenna elements 204 is separated from each adjacent antenna element 204 by a wall or a wall structure 206. The phased array antenna 202 can be coupled to the first RFFE circuitry that is coupled to the first RF module circuit that operates at a frequency within a bandwidth. The first RFFE circuitry is coupled to the set of antenna elements 204. The first RF module circuit can include a baseband processor. The support structure can be a circuit board, such as a PCB or other structure upon which the antenna elements can be positioned. The phased array antenna 202 includes a ground plane 210. Dielectric material 212 is located on a first side of the ground plane 210, and in particular, between the ground plane 210 and first plane of the antenna elements 204. The first plane and the ground plane are separated by a first distance (d). The antenna elements 204 are located on the dielectric material 212 in a first plane, and two adjacent antenna elements of an antenna array are separated by at least the second distance (d2). The phased array antenna 202 also includes a slot antenna 208 which is a calibration antenna and which is coupled to second RFFE circuitry that is coupled to a second RF module circuit that operates at the frequency within the bandwidth. In one embodiment, the slot antenna 208 is located in a portion of the wall structure 206 that is between an edge of the antenna structure 200 and a first antenna element 204, as depicted. In other embodiments, the slot antenna 208 is located between two adjacent antenna elements 204. In other embodiments, the slot antenna 208 is located between four adjacent antenna elements 204 that form corners of a square or rectangle.

Figure 2B:
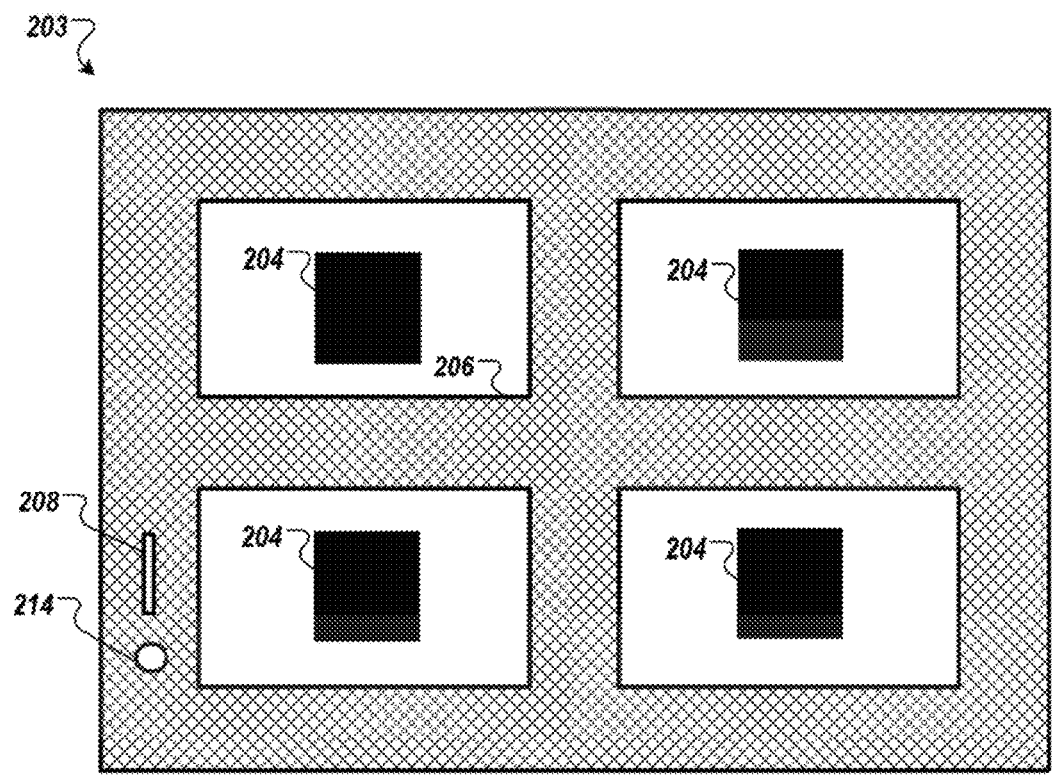
FIG. 2B illustrates a top view of the antenna structure with a phased array antenna with the set of antenna elements that are each separated by the wall structure including the slot antenna and a feed point according to one embodiment.

FIG. 2B illustrates a top view 203 of the antenna structure 200 with a phased array antenna with the set of antenna elements 204 that are each separated by the wall structure 206 including the slot antenna 208 and a feed point 214 according to one embodiment. The feed point 214 can be an antenna feed element or an antenna feed to feed a signal, such as an RF signal, to the slot antenna 208. For example, the feed point 214 can be an RF cable, a coaxial cable, or other type of RF feed. The wall structure 206 is a conductive material, which can be copper, gold, or the like. The wall structure 206 defines a set of physically separated regions. The wall structure 206 physically separates regions in which antenna elements 204 are located, and further electrically isolates each antenna element 204. In other words, at least a portion of the wall structure 206 separates a first region including a first antenna element from a second region including a second antenna element.

Figure 3:
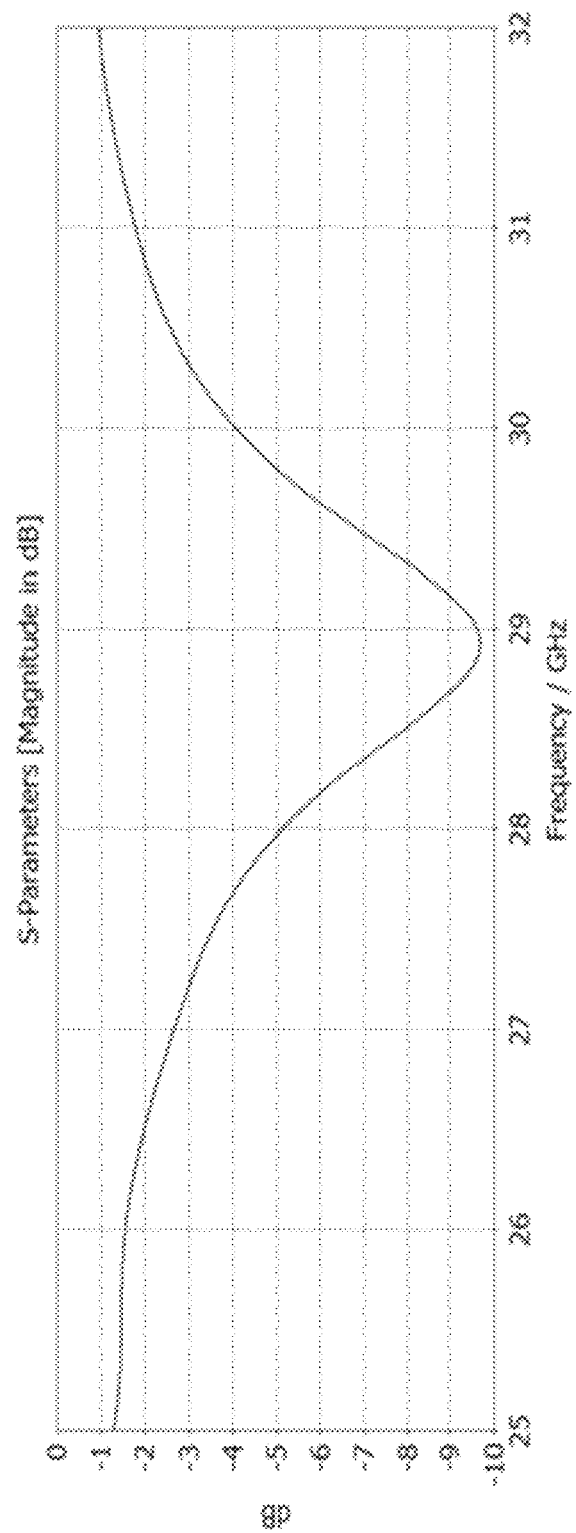
FIG. 3 is a graph of a return loss of a slot antenna embedded in a wall structure according to one embodiment.

FIG. 3 is a graph 300 of a return loss of a slot antenna embedded in a wall structure according to one embodiment. The slot antenna can be any of the slot antennas described herein, for example, the slot antenna 108 of FIG. 1A or the slot antenna 208 of FIGS. 2A-2B. Similarly, the wall structure can be any of the wall structures described herein, for example, the wall structure 106 of FIG. 1A or the wall structure 206 of FIGS. 2A-2B. A slot antenna could have a resonance frequency in a desired frequency range of operation of a phased array antenna. The graph 300 shows that in one embodiment, the slot antenna can have a resonance frequency close to 29 GHz which is in the range of frequency of operation.

Figure 4A:
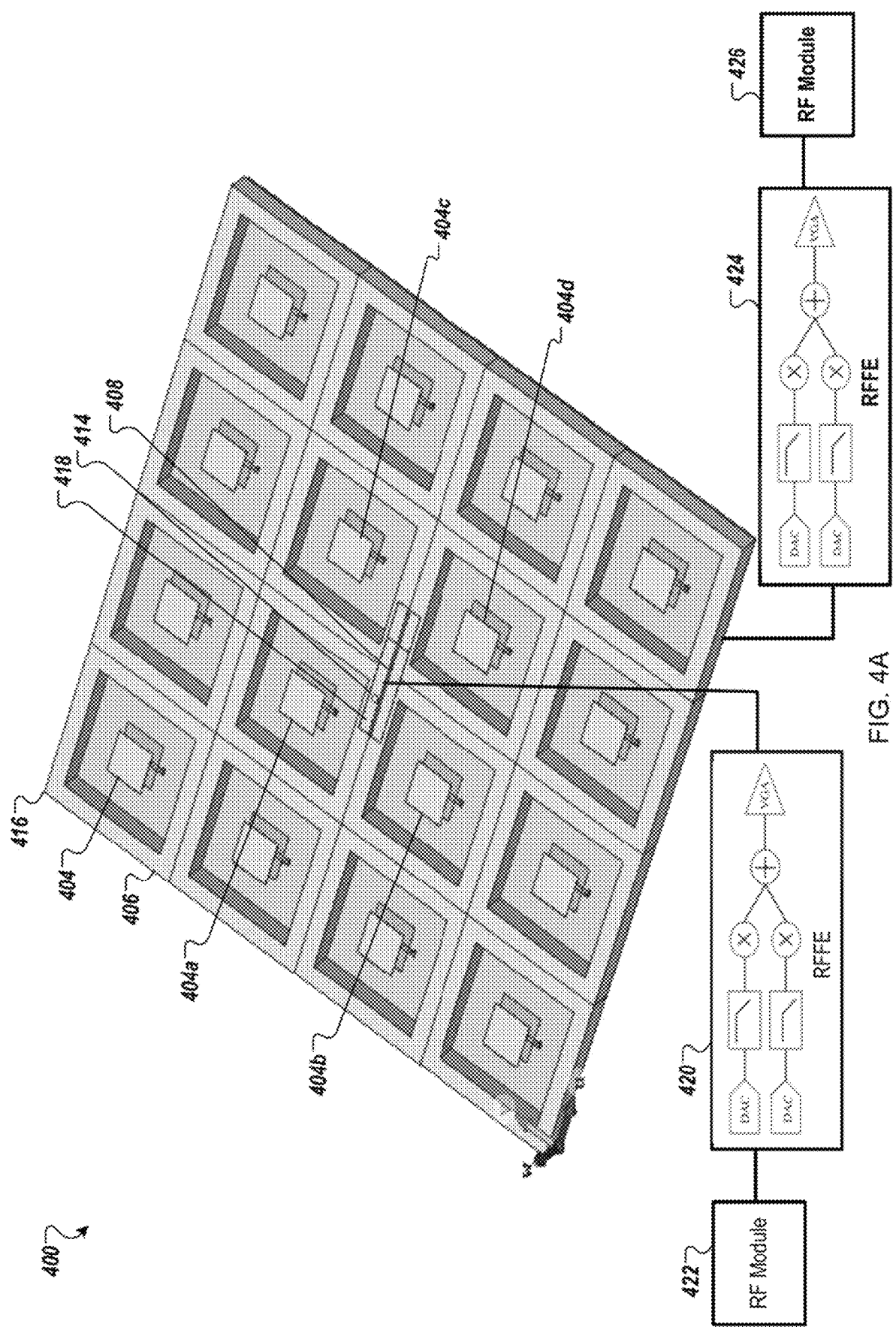
FIG. 4A illustrates an antenna module of an antenna structure according to one embodiment.

FIG. 4A illustrates an antenna module 416 of an antenna structure 400 according to one embodiment. Although not all components of the antenna structure 400 are shown, the antenna structure 400 is the same or similar to the antenna structure 100 of FIG. 1A and the antenna structure 200 of FIGS. 2A-2B as noted by similar reference numbers. An array antenna can be made up of antenna modules, or simply modules, that include a subset of antenna elements with the subset containing one to tens of antenna elements. The modules can be individually manufactured and assembled as an array antenna. Each antenna module thus incorporates an integer number of antenna elements. The antenna modules are often very closely spaced between each other, preventing the insertion of any other component between them. Constructing the array antenna with antenna modules that are identical can facilitate manufacturing, assembly, and part management. The array antenna is constructed using the antenna rectangular antenna modules. The antenna modules can be manufactured from a ceramic-based material, a Teflon-based material, organic materials, or the like. The antenna elements can be printed on the modules (e.g., using copper).

In the depicted embodiment, the antenna module 416 is a square 4×4 grid of antenna elements 404, and an antenna array, such as the phased array antenna 102 of FIG. 1A or the phased array antenna 202 of FIG. 2 can be constructed with a number of antenna modules that are identical to the antenna module 416. In other embodiments, an antenna module can be a rectangular n×m grid, where n and m are integers.

Each antenna element 404 of the antenna module 416 can include a feed point and be located on a first plane that is a first distance above a ground plane. The space between the first plane and the ground plane can be filled with a dielectric material. The antenna module 416 is separated into regions by a wall structure 406, and each antenna element 404 is located in a separate region. The wall structure 406 is a conductive material that electrically isolates each antenna element. A portion 418 of the wall structure 406 includes a slot that is a slot antenna 408. An RF feed point 414 is located at or near the slot antenna 408.

The portion 418 of the wall structure 406 that includes the slot antenna includes a first edge, a second edge, a third edge, and a fourth edge. The second edge is parallel to the first edge and separated from the first edge by a third distance (e.g., a width of the slot antenna). The third and fourth edges are perpendicular to the first and second edges. The fourth edge is parallel to the third edge and separated from the third edge by a fourth distance (e.g., a length of the slot antenna). The first edge, the second edge, the third edge, and the fourth edge are sides of a rectangular cutout that form the slot in the wall structure 406. The rectangular cutout is an aperture of the slot antenna 408 and radiates electromagnetic energy.

The length of the slot antenna (e.g., the fourth distance that separates the third edge and the fourth edge) can be significantly longer that the width of the slot antenna (e.g., the third distance that separates the first edge and the second edge). In other words, the width of the slot antenna can be substantially less than the length of the slot antenna, such that the rectangular cutout has an elongated rectangular shape that is parallel to the portion 418 of the wall structure 406. In other embodiments, however, the slot antenna can be designed to have a cutout of a different shape, such as square, elliptical, circular, or the like.

In one embodiment, a center of the slot antenna 408 is located in a center of the antenna module 416 (e.g., equi-distantly from the antenna elements 404a, 404b, 404c, and 404d). In another embodiment, the center of the slot antenna 408 is located at an edge of the antenna module 416. In another embodiment, the center of the slot antenna 408 can be located at other positions on the antenna module 416, such as between the antenna elements 404a and 404b, between the antenna elements 404c and 404d. In another embodiment, the slot of the slot antenna 408 can be rotated by 90 degrees and the center can be between the antenna elements 404a and 404c or 404b and 404d. Alternatively, the center of the slot antenna 408 can be adjacent to or between any two antenna elements 404.

Figure 4B:
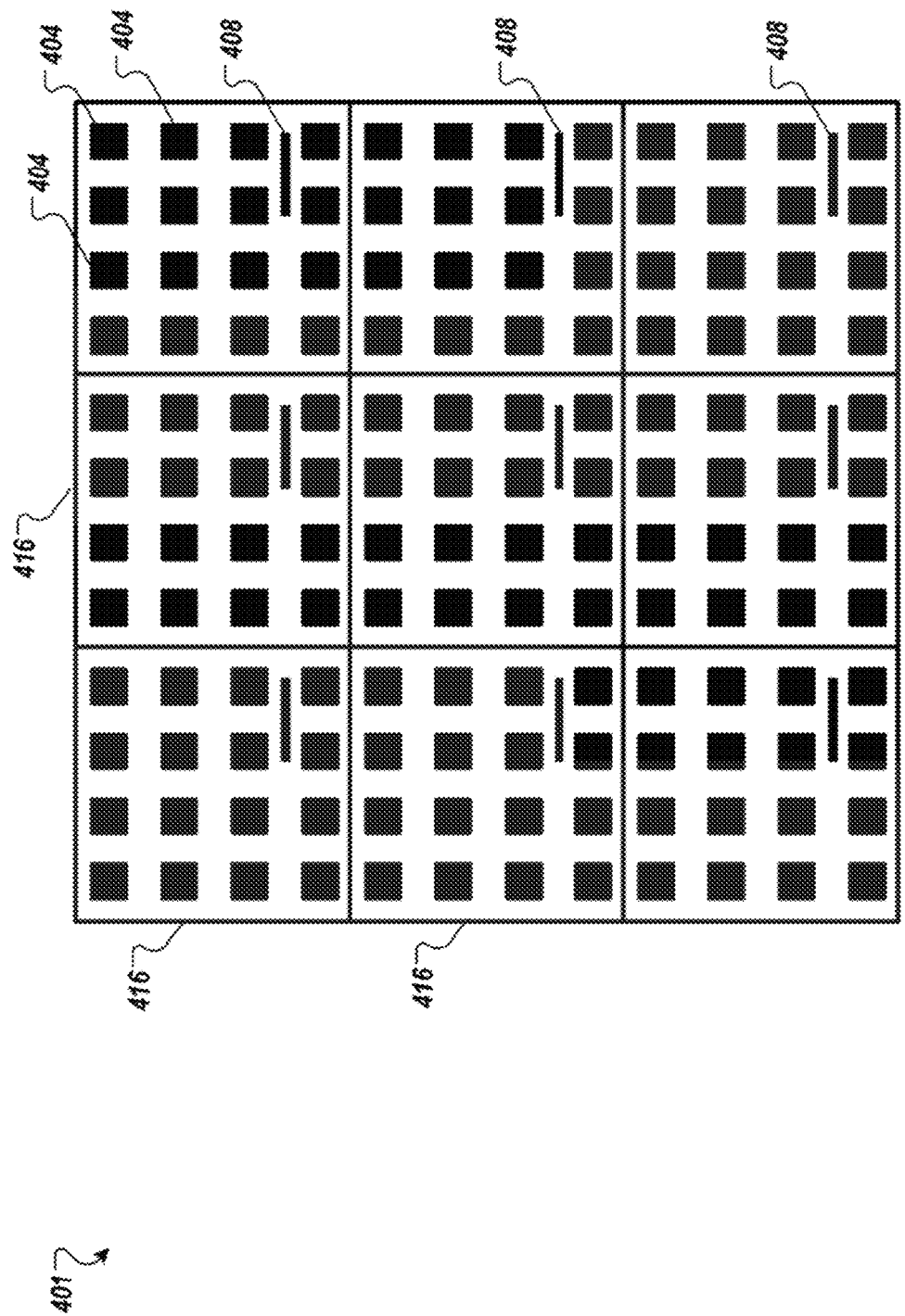
FIG. 4B illustrates an antenna structure with a phased array antenna that is made up of antenna modules, each including a slot antenna according to one embodiment.

The antenna structure 400 of the array antenna can be constructed from a set of identical antenna modules, which allows slot antennas, such as the slot antenna 408 to be located at regular intervals or positions within the antenna array, as described further with respect to FIG. 4B.

FIG. 4B illustrates an antenna structure 401 with a phased array antenna that is made up of antenna modules 416, each including a slot antenna 408 according to one embodiment. Although not all components of the antenna structure 401 are shown, the antenna structure 401 is the same or similar to the antenna structure 100 of FIG. 1A as noted by similar reference numbers, and the antenna module 416 is the same as the antenna module 416 of FIG. 4A. The array antenna can be made up of antenna modules, such as antenna modules 416, or simply modules, that include a subset of antenna elements with the subset containing one to tens of antenna elements 404. The antenna modules 416 can be individually manufactured and assembled as an array antenna. The array antenna can be large and can be made up of an array of antenna modules 416 that are attached to another substrate, such as a printed wiring board (PWB), for interconnection with an RF source. Each antenna module 416 thus incorporates an integer number of antenna elements 404. The antenna modules 416 are often very closely spaced between each other.

A phased array antenna structure, such as the phased array antenna 102 described with respect to FIG. 1A, can be constructed of a set of antenna modules 416. In one embodiment, the antenna module 416 is coupled to a support structure (not shown in FIG. 4B) of the phased array antenna. The phased array antenna includes a radio frequency (RF) circuit (e.g., an RF module). Radio frequency front-end (RFFE) is coupled to the RF circuit. The phased array antenna structure further includes a circuit board. In one embodiment, the antenna module 102 is electrically and physically coupled to the circuit board. The antenna module 102 has a rectangular shape and includes a set (e.g., of twelve, sixteen, or other integer number) of antenna elements 404 that are disposed in a square grid pattern. In other embodiments, the antenna elements can be disposed in other patterns such as a triangular lattice pattern, a hexagonal pattern, or the like. Each antenna module 416 includes a slot antenna 408 that can radiate electromagnetic energy for calibration of the corresponding antenna module 416 as well as neighboring antenna modules 416.

The phased array antenna can be coupled to first RFFE circuitry 424 that is coupled to a first RF module circuit 426. The first RFFE circuitry 424 is coupled to the set of antenna elements 404 on the antenna module 416. The first RF module circuit 426 can include a baseband processor. The support structure can be a circuit board, such as a PCB or other structure upon which the antenna elements can be positioned. The phased array antenna includes a ground plane. Dielectric material is located on a first side of the ground plane, and in particular, between the ground plane and a first plane on which the antenna elements 404 are located. The antenna elements 204 are located on the dielectric material in the first plane. The phased array antenna also includes a slot antenna 408 which is a calibration antenna and which is coupled to second RFFE circuitry 420 that is coupled to a second RF module circuit 422. In one embodiment, the slot antenna 408 is located in a portion of the wall structure 406 that is between an edge of the antenna structure 400 and a first antenna element 404. In other embodiments, the slot antenna 408 is located between two adjacent antenna elements 404. In other embodiments, the slot antenna 408 is located between four adjacent antenna elements 404 that form corners of a square or rectangle.

Each of the first RFFE circuitry 424 and the second RFFE circuitry 420 includes one or more receiver chains to receive a signal and/or one or more transmitter chains to transmit a signal. It should be noted that RFFE circuitry 420 and 424 include at least a digital-to-analog converter (DAC) or an analog-to-digital converter (ADC), a filter (such as a high pass filter, a low-pass filter, a band-pass filter, or the like), a mixer, a local oscillator, and amplifiers (such as a low-noise amplifier, a power amplifier, a variable-gain amplifier, or the like). In addition, RFFE circuitry can include other components such as clock generators, phase shifters, and the like.

Figure 5:
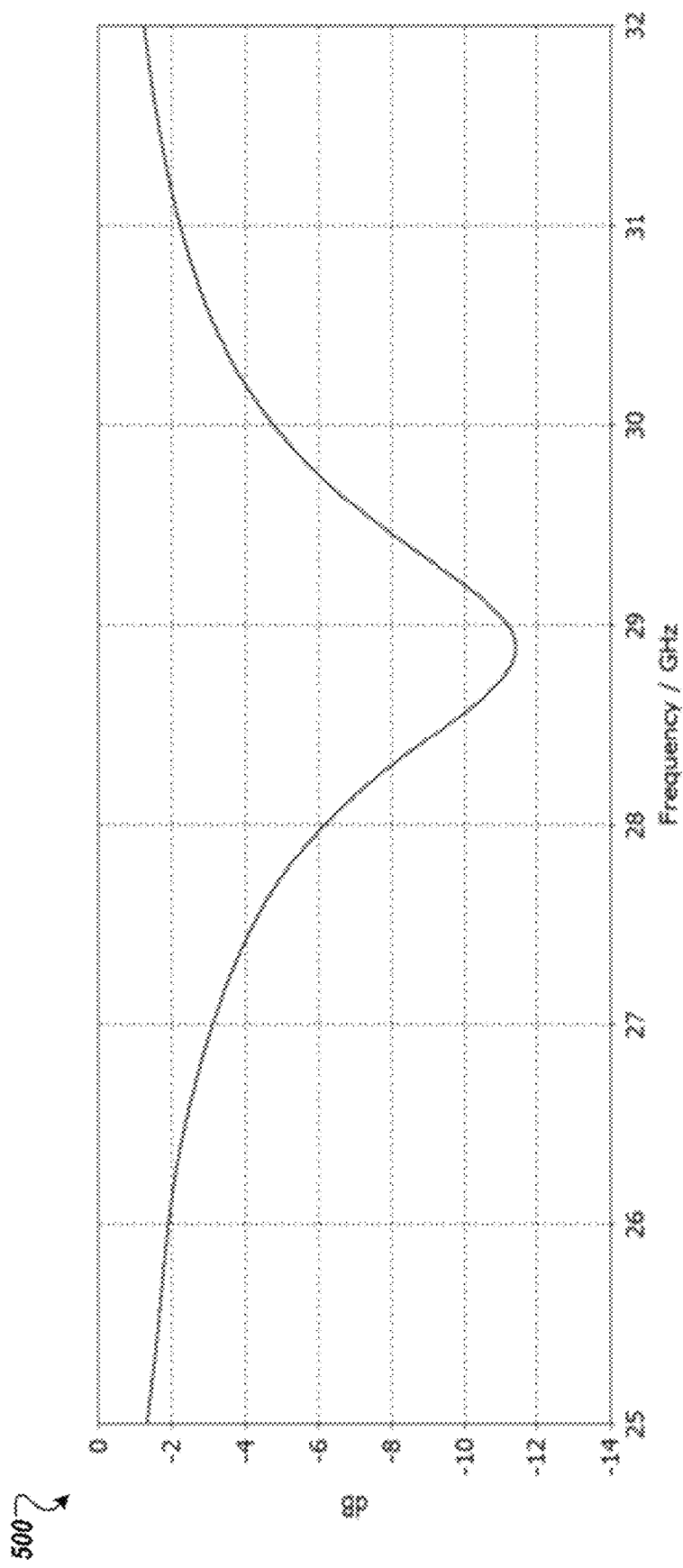
FIG. 5 is a graph of a return loss of a slot antenna embedded in a wall structure of a phased array antenna according to one embodiment.

FIG. 5 is a graph 500 of a return loss of a slot antenna embedded in a wall structure of a phased array antenna according to one embodiment. The slot antenna can be any of the slot antennas described herein, for example, the slot antenna 108 of FIG. 1, the slot antenna 208 of FIGS. 2A-2B, or the slot antenna 408 of FIG. 4. Similarly, the wall structure can be any of the wall structures described herein, for example, the wall structure 106 of FIG. 1, the wall structure 206 of FIGS. 2A-2B, or the wall structure 406 of FIG. 4. Similarly, the phased array antenna can be the phased array antenna 102 of FIG. 1, the phased array antenna 202 of FIGS. 2A-2B, or the phased array antenna 402 of FIG. 4. The graph 500 shows the return loss of the slot antenna with the surrounding antenna elements, and shows that the slot antenna has a resonance in the required frequency band (e.g., between 28.5 GHz and 29.1 GHz).

Figure 6:
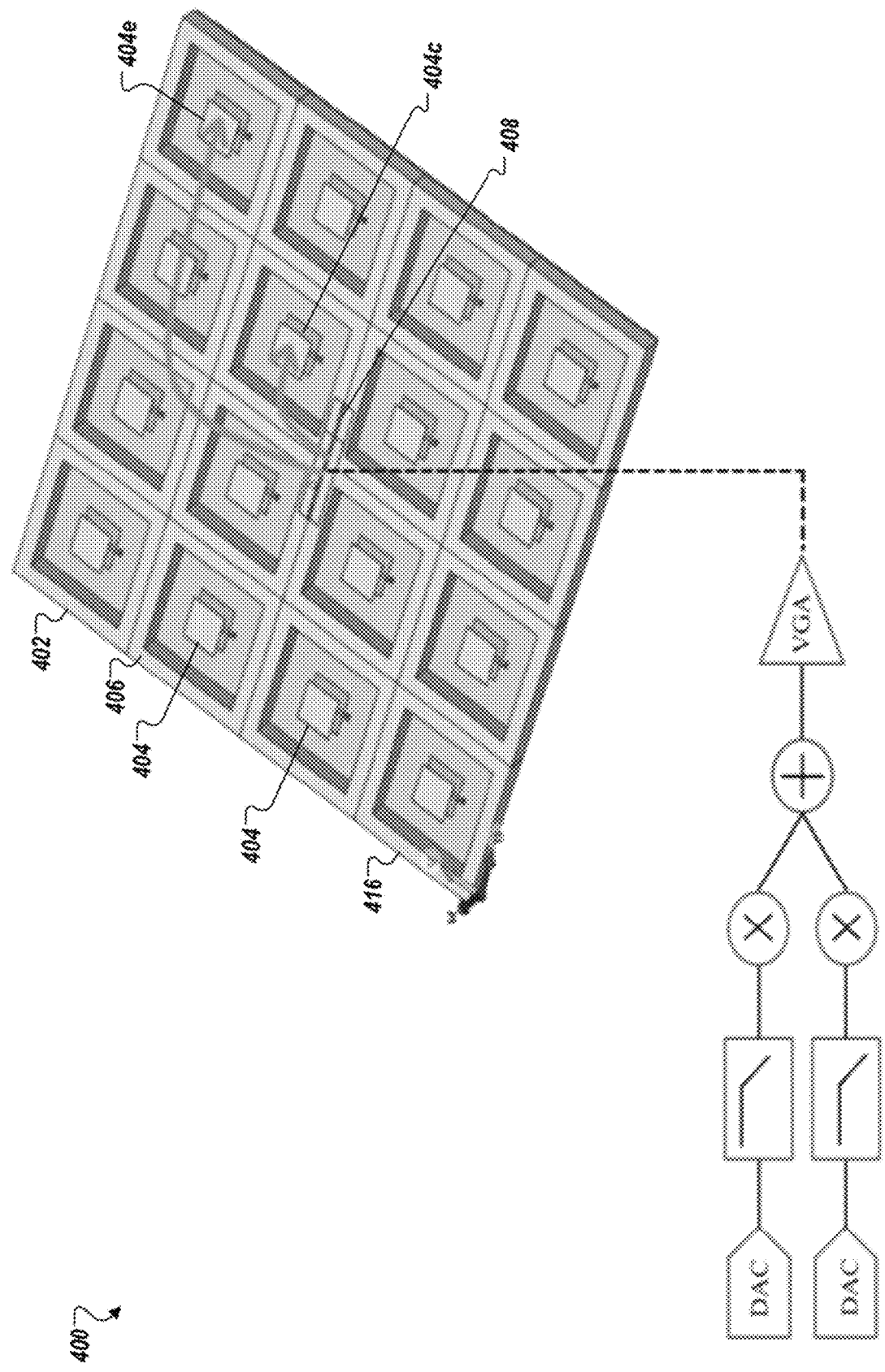
FIG. 6 illustrates an antenna structure with a slot antenna for calibration according to one embodiment.

FIG. 6 illustrates an antenna structure 400 with a slot antenna 408 for calibration according to one embodiment. Although not all components of the antenna structure 600 are shown, the antenna structure 400 is the same or similar to the antenna structure 400 of FIG. 4 as noted by similar reference numbers.

The slot antenna 408 can be used for in-orbit calibration of the phased array antenna. The antenna elements 404 are coupled to first RFFE circuitry that is coupled to a first RF module circuit. The slot antenna 408 is coupled to second RFFE circuitry that is coupled to a second RF module circuit. The first RFFE circuitry and the second RFFE circuitry can include various components such as digital-to-analog converters (DACs), analog-to-digital converters (ADCs), filters (such as band-pass filters, low-pass filters, high-pass filters, and the like), mixers, amplifiers (such as variable gain amplifiers (VGAs), low noise amplifiers (LNAs), power amplifiers (PAs), and the like) in a transmit or receive chain. The first RF module circuit can include at least one RF component that has at least one of a phase parameter value, a gain parameter value, or a time-delay parameter value that are adjustable for calibrating at least one of a phase, a gain, or a time delay of a signal path between the first RF module circuit and at least one the antenna elements 404. Reference data can be obtained and stored in a memory device initially before the phased array antenna 402 is launched and deployed in orbit. The slot antenna 408 can serve as a calibration antenna within the phased array antenna 402 to gather data from antenna elements 404 of the phased array antenna. The data can be compared to the reference data, and at least one of the phase parameter value, the gain parameter value, or the time-delay parameter value of the at least RF component can be adjusted based on the comparison.

In one embodiment, the phased array antenna 402 can perform a first calibration. The first RF module circuit sends a first signal (e.g., such as an RF signal or other electromagnetic signal) via at least one of the antenna elements 404 including the antenna element 404e and/or the antenna element 404c. The second RF module circuit receives a second signal via the slot antenna 408. The second signal is responsive to the first signal. Data associated with the second signal can be compared by a processor coupled to the memory device to the reference data stored on the memory device. At least one of the phase parameter value, the gain parameter value, or the time-delay parameter value of the at least RF component can be adjusted based on the comparison.

In another embodiment, the phased array antenna 602 can perform a second calibration. The second RF module circuit sends a third signal via the slot antenna 408. The first RF module circuit receives a fourth signal via at least one of the antenna elements 404 including the antenna element 404e and/or the antenna element 404c. The fourth signal is responsive to the third signal. Data associated with the fourth signal can be compared by the processor to the reference data stored on the memory device. At least one of the phase parameter value, the gain parameter value, or the time-delay parameter value of the at least RF component can be adjusted based on the comparison.

One factor that should be considered in the design of the slot antenna 408 is the coupling between the slot antenna 408 and each of the antenna elements 404. For example, the difference between the largest coupling value and the smallest coupling value (e.g., the difference between the coupling value with the antenna element that is closest to the slot antenna and the coupling value with the antenna element that is furthest from the slot antenna) can set limitations on the required output power dynamic range. In some cases, the slot antenna 408 is used only to calibrate antenna elements within the corresponding antenna module, so the antenna element that is the furthest from the slot antenna refers to an antenna element on the same antenna module as the slot antenna. The slot antenna 408 needs to be designed to provide a sufficiently large signal-to-noise ratio (SNR) for each of the antenna elements 404 receiving the third signal for a transmit calibration (e.g., the second calibration). Such as described below with respect to FIG. 7, the slot antenna 408 needs to have a coupling value that is between a maximum coupling value and a minimum coupling value for calibration. In other embodiments, the slot antenna 408 can be designed with a larger dynamic range to calibrate antenna elements within the corresponding antenna module as well as antenna elements in neighboring antenna modules.

The power of the calibration signal (e.g., the third signal) that is received by each antenna element 404 from the slot antenna 408 depends on the position of the antenna element 404 relative to the slot antenna 408 as well as the distance between the antenna element 404 and the slot antenna 408. For example, the radiation pattern of the slot antenna 408 will cause the power received to depend on relative position, while the power received decreases with distance. To minimize these effects on calibration accuracy, the SNR of the third signal at each antenna element 404 should be greater than a minimum threshold value regardless of the position of the antenna element 404.

Figure 7:
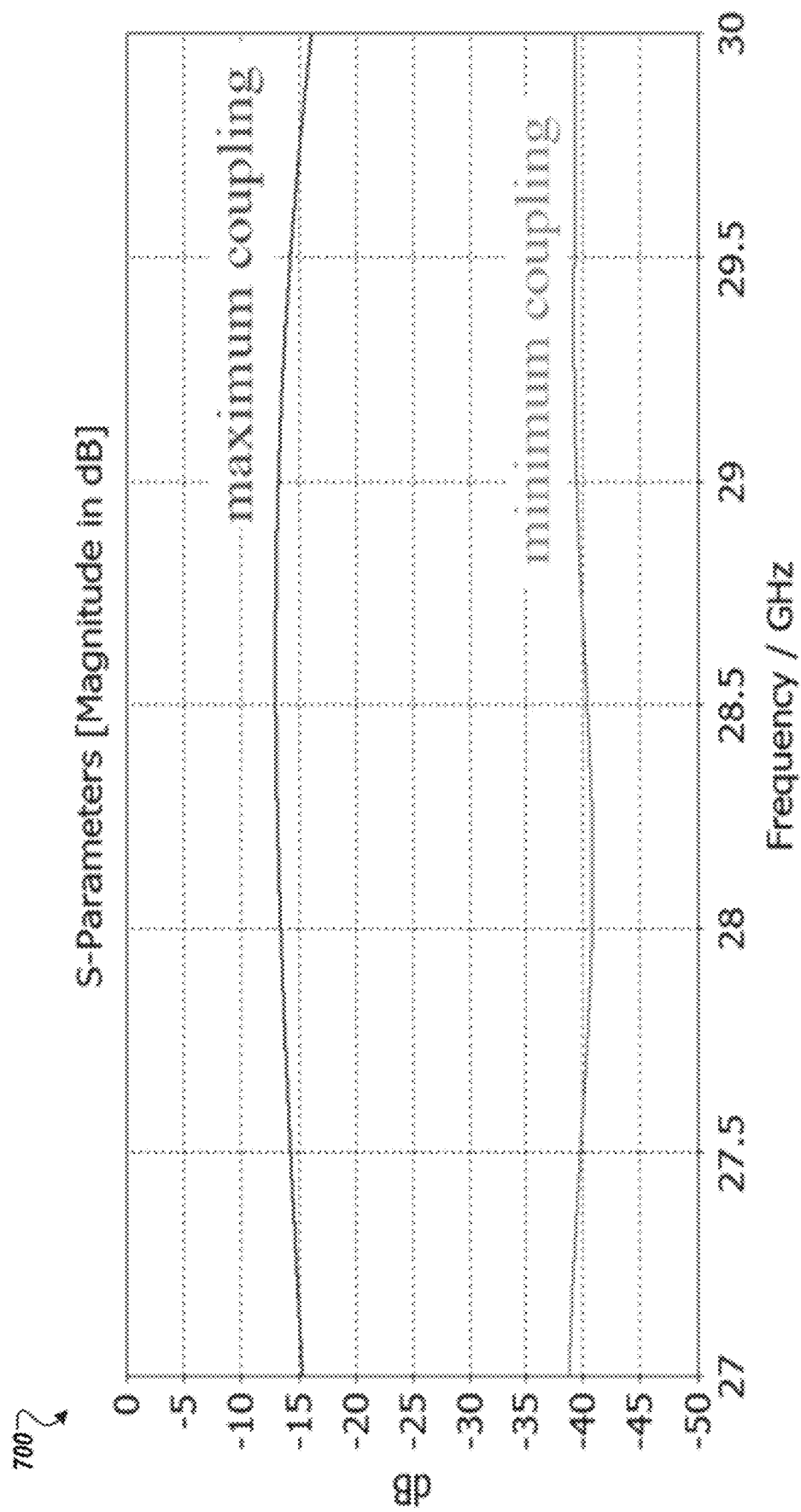
FIG. 7 is a graph of a maximum coupling value and a minimum coupling value between a slot antenna and an antenna element according to one embodiment.

FIG. 7 is a graph 700 of a maximum coupling value and a minimum coupling value between a slot antenna and an antenna element according to one embodiment. The slot antenna can be the slot antenna 408 of FIG. 4 and FIG. 6. The antenna element can be one of the antenna elements 404 of FIG. 4 and FIG. 6. In particular, the graph 700 shows the maximum coupling value and the minimum coupling value in a 4×4 array of antenna elements. In one embodiment, the desired operating frequency is 29 GHz, and the graph 700 shows that the range in the coupling value at the desired operating frequency is 26 dB. The range can determine the minimum required dynamic range for the slot antenna for a transmit calibration.

It should be noted that the antenna module 416 is depicted as a 4×4 module to construct a larger array (that has have thousands of antenna elements), the antenna module 416 can be repeated to obtain a very large antenna array. The slot antenna can be used as a calibration antenna also be used to gather data from neighboring antenna modules as well as its corresponding antenna module in order to obtain and store redundant data (for an over-determined system). In some cases, when an antenna element receives a calibration signal from more than one slot antenna, the data is redundant and allows for more accurate calibration of the antenna elements (and corresponding RF components) as well as calibration of the slot antennas themselves.

Figure 8:
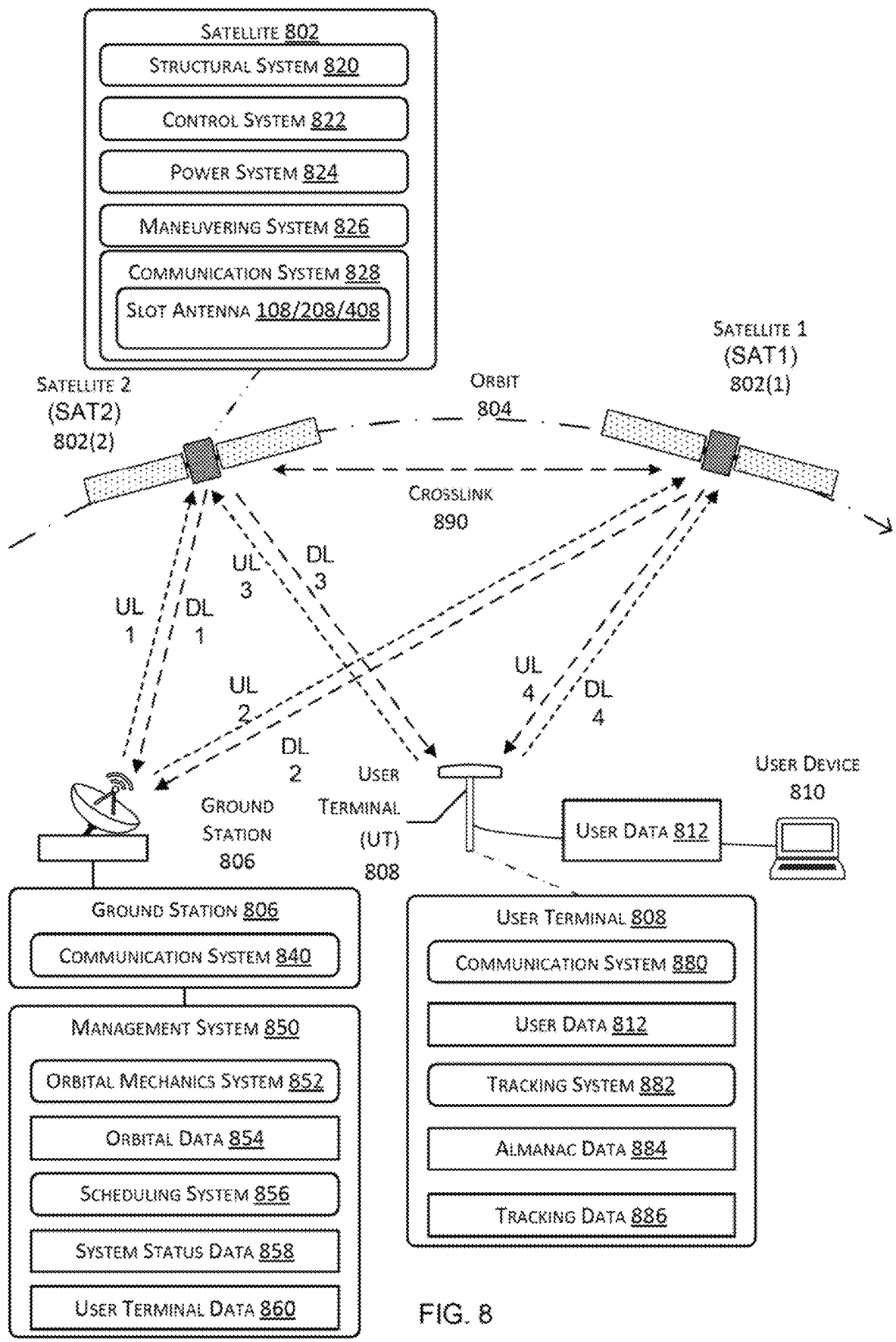
FIG. 8 illustrates a system including a constellation of satellites, each satellite being in orbit according to one embodiment.

FIG. 8 illustrates a system 800 including a constellation of satellites 802(1), 802(2), . . . , 802(S), each satellite 802 being in orbit 804 according to one embodiment. The system 800 shown here comprises a plurality (or "constellation") of satellites 802(1), 802(2), . . . , 802(S), each satellite 802 being in orbit 804. Any of the satellites 802 can include the antenna structure 100 of FIG. 1, the antenna structure 200 of FIG. 2, or the antenna structure 400 of FIG. 4. Also shown is a ground station 806, user terminal (UT) 808, and a user device 810.

The constellation may comprise hundreds or thousands of satellites 802, in various orbits 804. For example, one or more of these satellites 802 may be in non-geosynchronous orbits (NGOs) in which they are in constant motion with respect to the Earth. For example, the orbit 804 is a low earth orbit (LEO). In this illustration, orbit 804 is depicted with an arc pointed to the right. A first satellite (SAT1) 802(1) is leading (ahead of) a second satellite (SAT2) 802(2) in the orbit 804.

The satellite 802 may comprise a structural system 820, a control system 822, a power system 824, a maneuvering system 826, and a communication system 828 including a phased array antenna with calibration slot antenna in an array wall, such as the slot antenna 108 of FIG. 1, the slot antenna 208 of FIG. 2, and the slot antenna 408 of FIG. 4 described herein. In other implementations, some systems may be omitted or other systems added. One or more of these systems may be communicatively coupled with one another in various combinations.

The structural system 820 comprises one or more structural elements to support operation of the satellite 802. For example, the structural system 820 may include trusses, struts, panels, and so forth. The components of other systems may be affixed to, or housed by, the structural system 820. For example, the structural system 820 may provide mechanical mounting and support for solar panels in the power system 824. The structural system 820 may also provide for thermal control to maintain components of the satellite 802 within operational temperature ranges. For example, the structural system 820 may include louvers, heat sinks, radiators, and so forth.

The control system 822 provides various services, such as operating the onboard systems, resource management, providing telemetry, processing commands, and so forth. For example, the control system 822 may direct operation of the communication system 828.

The power system 824 provides electrical power for operation of the components onboard the satellite 802. The power system 824 may include components to generate electrical energy. For example, the power system 824 may comprise one or more photovoltaic cells, thermoelectric devices, fuel cells, and so forth. The power system 824 may include components to store electrical energy. For example, the power system 824 may comprise one or more batteries, fuel cells, and so forth.

The maneuvering system 826 maintains the satellite 802 in one or more of a specified orientation or orbit 804. For example, the maneuvering system 826 may stabilize the satellite 802 with respect to one or more axis. In another example, the maneuvering system 826 may move the satellite 802 to a specified orbit 804. The maneuvering system 826 may include one or more computing devices, sensors, thrusters, momentum wheels, solar sails, drag devices, and so forth. For example, the sensors of the maneuvering system 826 may include one or more global navigation satellite system (GNSS) receivers, such as global positioning system (GPS) receivers, to provide information about the position and orientation of the satellite 802 relative to Earth. In another example, the sensors of the maneuvering system 826 may include one or more star trackers, horizon detectors, and so forth. The thrusters may include, but are not limited to, cold gas thrusters, hypergolic thrusters, solid-fuel thrusters, ion thrusters, arcj et thrusters, electrothermal thrusters, and so forth.

The communication system 828 provides communication with one or more other devices, such as other satellites 802, ground stations 806, user terminals 808, and so forth. The communication system 828 may include one or more modems, digital signal processors, power amplifiers, antennas (including at least one antenna that implements multiple antenna elements, such as a phased array antenna, and including an embedded calibration antenna, such as the calibration antenna 104 as described herein), processors, memories, storage devices, communications peripherals, interface buses, and so forth. Such components support communications with other satellites 802, ground stations 806, user terminals 808, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 828 may be output to other systems, such as to the control system 822, for further processing. Output from a system, such as the control system 822, may be provided to the communication system 828 for transmission.

One or more ground stations 806 are in communication with one or more satellites 802. The ground stations 806 may pass data between the satellites 802, a management system 850, networks such as the Internet, and so forth. The ground stations 806 may be emplaced on land, on vehicles, at sea, and so forth. Each ground station 806 may comprise a communication system 840. Each ground station 806 may use the communication system 840 to establish communication with one or more satellites 802, other ground stations 806, and so forth. The ground station 806 may also be connected to one or more communication networks. For example, the ground station 806 may connect to a terrestrial fiber optic communication network. The ground station 806 may act as a network gateway, passing user data 812 or other data between the one or more communication networks and the satellites 802. Such data may be processed by the ground station 806 and communicated via the communication system 840. The communication system 840 of a ground station may include components similar to those of the communication system 828 of a satellite 802 and may perform similar communication functionalities. For example, the communication system 840 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 806 are in communication with a management system 850. The management system 850 is also in communication, via the ground stations 806, with the satellites 802 and the UTs 808. The management system 850 coordinates operation of the satellites 802, ground stations 806, UTs 808, and other resources of the system 800. The management system 850 may comprise one or more of an orbital mechanics system 852 or a scheduling system 856.

The orbital mechanics system 852 determines orbital data 854 that is indicative of a state of a particular satellite 802 at a specified time. In one implementation, the orbital mechanics system 852 may use orbital elements that represent characteristics of the orbit 804 of the satellites 802 in the constellation to determine the orbital data 854 that predicts location, velocity, and so forth of particular satellites 802 at particular times or time intervals. For example, the orbital mechanics system 852 may use data obtained from actual observations from tracking stations, data from the satellites 802, scheduled maneuvers, and so forth to determine the orbital elements. The orbital mechanics system 852 may also consider other data, such as space weather, collision mitigation, orbital elements of known debris, and so forth.

The scheduling system 856 schedules resources to provide communication to the UTs 808. For example, the scheduling system 856 may determine handover data that indicates when communication is to be transferred from the first satellite 802(1) to the second satellite 802(2). Continuing the example, the scheduling system 856 may also specify communication parameters such as frequency, timeslot, and so forth. During operation, the scheduling system 856 may use information such as the orbital data 854, system status data 858, user terminal data 860, and so forth.

The system status data 858 may comprise information such as which UTs 808 are currently transferring data, satellite availability, current satellites 802 in use by respective UTs 808, capacity available at particular ground stations 806, and so forth. For example, the satellite availability may comprise information indicative of satellites 802 that are available to provide communication service or those satellites 802 that are unavailable for communication service. Continuing the example, a satellite 802 may be unavailable due to malfunction, previous tasking, maneuvering, and so forth. The system status data 858 may be indicative of past status, predictions of future status, and so forth. For example, the system status data 858 may include information such as projected data traffic for a specified interval of time based on previous transfers of user data 812. In another example, the system status data 858 may be indicative of future status, such as a satellite 802 being unavailable to provide communication service due to scheduled maneuvering, scheduled maintenance, scheduled decommissioning, and so forth.

The user terminal data 860 may comprise information such a location of a particular UT 808. The user terminal data 860 may also include other information such as a priority assigned to user data 812 associated with that UT 808, information about the communication capabilities of that particular UT 808, and so forth. For example, a particular UT 808 in use by a business may be assigned a higher priority relative to a UT 808 operated in a residential setting. Over time, different versions of UTs 808 may be deployed, having different communication capabilities such as being able to operate at particular frequencies, supporting different signal encoding schemes, having different antenna configurations, and so forth.

The UT 808 includes a communication system 880 to establish communication with one or more satellites 802. The communication system 880 of the UT 808 may include components similar to those of the communication system 828 of a satellite 802 and may perform similar communication functionalities. For example, the communication system 880 may include one or more modems, digital signal processors, power amplifiers, antennas (including at least one antenna that implements multiple antenna elements, such as a phased array antenna), processors, memories, storage devices, communications peripherals, interface buses, and so forth. The UT 808 passes user data 812 between the constellation of satellites 802 and the user device 810. The user data 812 includes data originated by the user device 810 or addressed to the user device 810. The UT 808 may be fixed or in motion. For example, the UT 808 may be used at a residence, or on a vehicle such as a car, boat, aerostat, drone, airplane, and so forth.

The UT 808 includes a tracking system 882. The tracking system 882 uses almanac data 884 to determine tracking data 886. The almanac data 884 provides information indicative of orbital elements of the orbit 804 of one or more satellites 802. For example, the almanac data 884 may comprise orbital elements such as "two-line element" data for the satellites 802 in the constellation that are broadcast or otherwise sent to the UTs 808 using the communication system 880.

The tracking system 882 may use the current location of the UT 808 and the almanac data 884 to determine the tracking data 886 for the satellite 802. For example, based on the current location of the UT 808 and the predicted position and movement of the satellites 802, the tracking system 882 is able to calculate the tracking data 886. The tracking data 886 may include information indicative of azimuth, elevation, distance to the second satellite, time of flight correction, or other information at a specified time. The determination of the tracking data 886 may be ongoing. For example, the first UT 808 may determine tracking data 886 every 800 ms, every second, every five seconds, or at other intervals.

With regard to FIG. 8, an uplink is a communication link which allows data to be sent to a satellite 802 from a ground station 806, UT 808, or device other than another satellite 802. Uplinks are designated as UL1, UL2, UL3 and so forth. For example, UL1 is a first uplink from the ground station 806 to the second satellite 802(2). In comparison, a downlink is a communication link which allows data to be sent from the satellite 802 to a ground station 806, UT 808, or device other than another satellite 802. For example, DL1 is a first downlink from the second satellite 802(2) to the ground station 806. The satellites 802 may also be in communication with one another. For example, a crosslink 890 provides for communication between satellites 802 in the constellation.

The satellite 802, the ground station 806, the user terminal 808, the user device 810, the management system 850, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components. In one embodiment, the system memory stores instructions of methods to control operation of the electronic device. The electronic device performs functions by using the processor(s) to execute instructions provided by the system memory. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 9:
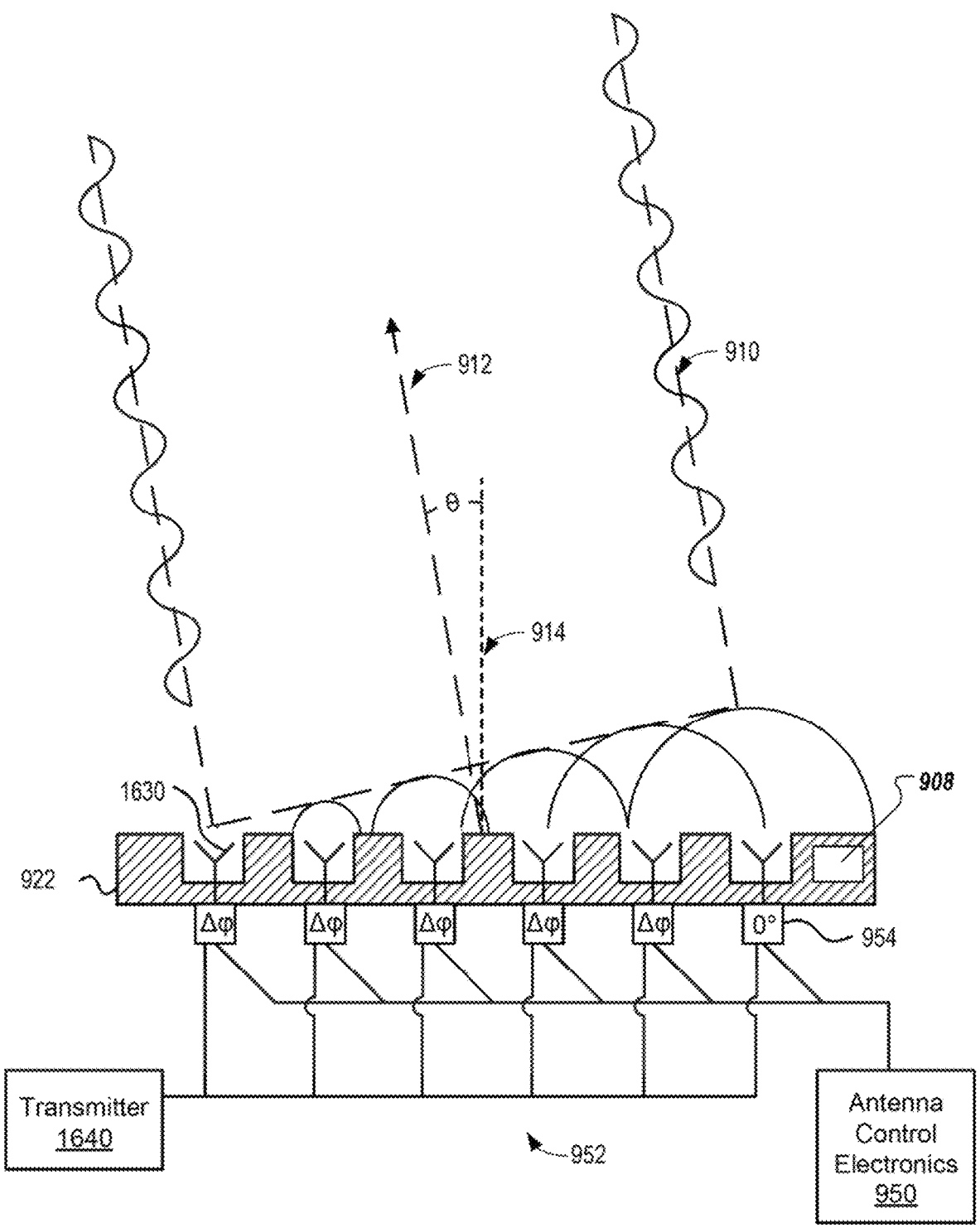
FIG. 9 illustrates a simplified schematic of an antenna, according to embodiments of the present disclosure.

FIG. 9 illustrates a simplified schematic of an antenna 900, according to embodiments of the present disclosure. As illustrated, the antenna 900 is a phased array antenna that includes multiple antenna elements 930 and slot antenna 908 embedded in a conductive array wall. The slot antenna 908 can be any of the calibration antennas 108/208/408 described above. Interference between the antenna elements 930 forms a directional radiation pattern in both transmitter and receiver arrays forming a beam 910 (beam extents shown as dashed lines). The beam 910 is a portion of a larger transmission pattern (not shown) that extends beyond the immediate vicinity of the antenna 900. The beam 910 is directed along a beam vector 912, described by an angle "θ" relative to an axis 914 normal to a surface of the antenna 900. As described below, the beam 910 is one or more of steerable or shapeable through control of operating parameters including, but not limited to a phase and an amplitude of each antenna element.

In FIG. 9, the antenna 900 includes, within a transmitter section 922, the plurality of antenna elements 930, which may include, but are not limited to, omnidirectional transmitter antennas coupled to a transmitter system 940. The transmitter system 940 provides a signal, such as a downlink signal to be transmitted to a ground station on the surface. The downlink signal is provided to each antenna element 930 as a time-varying signal that may include several multiplexed signals. To steer the beam 910 relative to the axis 914, the phased array antenna system 900 includes antenna control electronics 950 controlling a radio frequency (RF) feeding network 952, including a plurality of signal conditioning components 954 interposed between the antenna elements 930 and the transmitter system 940. The signal conditioning components 954 introduce one or more of a phase modulation or an amplitude modulation, as denoted by "Δφ" in FIG. 9, to the signal sent to the antenna elements 930. As shown in FIG. 9, introducing a progressive phase modulation produces interference in the individual transmission of each antenna element 930 that generates the beam 910.

The phase modulation imposed on each antenna element will differ and will be dependent on a spatial location of a communication target that determines an optimum beam vector (e.g., where the beam vector 912 is found by one or more of maximizing signal intensity or connection strength). The optimum beam vector may change with time as the communication target moves relative to the phased array antenna system 900.

Although antenna 900 is illustrated with a transmitter section 922, in other embodiments, the antenna 900 can be a receiver section that includes the plurality of antenna elements 930 coupled to a receiver system (not illustrated). The embedded calibration antenna 932 can be embedded within the dielectric material as described herein.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A communication system comprising:
a first radio frequency (RF) module circuit;
first radio frequency front-end (RFFE) circuitry coupled to the first RF module circuit;
a second RF module circuit;
second RFFE circuitry coupled to the second RF module circuit;
a phased array antenna coupled to the first RFFE circuitry, the phased array antenna comprising:
a ground plane;
a plurality of antenna elements located in a first plane that is separated from the ground plane by a first distance;
a wall structure comprising conductive material, the wall structure defining a plurality of regions that are electrically isolated from each other, wherein a first antenna element is located in a first region of the plurality of regions and a second antenna element is located in a second region of the plurality of regions, wherein a first portion of the wall structure has a first width and separates the first region from the second region; and
a slot antenna located in the first portion of the wall structure, the slot antenna being coupled to the second RFFE circuitry.

2. The communication system of claim 1, wherein a center of the slot antenna is located between the first antenna element and the second antenna element.

3. The communication system of claim 1, wherein a center of the slot antenna is located equidistantly between a center of the first antenna element, a center of the second antenna element, a center of a third antenna element of the plurality of antenna elements, and a center of a fourth antenna element of the plurality of antenna elements, the third antenna element being adjacent to the first antenna element, and the fourth antenna element being adjacent to the second antenna element and the third antenna element.

4. A communication system comprising:
a radio frequency (RF) module circuit;
radio frequency front-end (RFFE) circuitry coupled to the RF module circuit; and
an antenna array coupled to the RFFE circuitry, the antenna array comprising a circuit board and a plurality of identical antenna modules electrically and physically coupled to the circuit board, wherein the plurality of identical antenna modules includes a first antenna module, wherein the first antenna module comprises:
a plurality of antenna elements located in a first plane that is separated from a ground plane by a first distance;
a conductive wall structure electrically isolating each of the plurality of antenna elements, the conductive wall structure comprising a portion separating a first antenna element and a second antenna element of the plurality of antenna elements, the portion comprising a slot antenna; and
an RF feed point located at the slot antenna.

5. The communication system of claim 4, wherein the slot antenna is rectangular in shape and the slot antenna radiates energy at edges of the rectangular shape.

6. The communication system of claim 4, wherein the portion further separates a third antenna element and a fourth antenna element of the plurality of antenna elements, wherein the third antenna element is adjacent to the first antenna element, the fourth antenna element is adjacent to the second antenna element and the third antenna element, and a center of the slot antenna is located between the third antenna element and the fourth antenna element.

7. The communication system of claim 6, wherein a center of the slot antenna is located equidistantly from a center of the first antenna element, a center of the second antenna element, a center of the third antenna element, and a center of the fourth antenna element.

8. The communication system of claim 4, further comprising dielectric material disposed between the ground plane and the first plane, wherein the plurality of antenna elements are located on the dielectric material.

9. The communication system of claim 4, wherein the communication system is part of a satellite.

10. The communication system of claim 4, wherein the slot antenna radiates electromagnetic energy to calibrate the plurality of antenna elements.

11. The communication system of claim 4, further comprising a second antenna module identical to the first antenna module and coupled to the first antenna module, wherein the slot antenna radiates electromagnetic energy to calibrate the plurality of antenna elements and a second plurality of antenna elements of the second antenna module.

12. The communication system of claim 4, wherein the plurality of antenna elements are patch antennas.

13. The communication system of claim 4, wherein:
the antenna array is a phased array antenna and is part of a satellite; and
the slot antenna is used for in-orbit calibration of the phased array antenna.

14. A satellite comprising:
a structural system;
a control system;
a power system;
a maneuvering system; and
a communication system with a phased array antenna and a calibration slot antenna, wherein:
the phased array antenna comprises a circuit board and a plurality of identical antenna modules electrically and physically coupled to the circuit board, wherein the plurality of identical antenna modules includes a first antenna module, wherein the first antenna module comprises:
a plurality of antenna elements located in a first plane that is separated from a ground plane by a first distance; and
a conductive wall structure electrically isolating each of the plurality of antenna elements, the conductive wall structure comprising a portion separating a first antenna element and a second antenna element of the plurality of antenna elements, the portion comprising the calibration slot antenna.

15. The satellite of claim 14, wherein the communication system further comprises:
one or more radio frequency (RF) module circuits;
radio frequency front-end (RFFE) circuitry coupled to the one or more RF module circuits, wherein:
the phased array antenna comprises a ground plane located in a first plane separate from a second plane of the plurality of identical antenna modules; and
the conductive wall structure defines a plurality of regions that are electrically isolated from each other, wherein the first antenna element is located in a first region of the plurality of regions and the second antenna element is located in a second region of the plurality of regions, wherein the portion has a first width and separates the first region from the second region.

16. The satellite of claim 14, wherein a center of the calibration slot antenna is located between the first antenna element and the second antenna element.

17. The satellite of claim 14, wherein a center of the calibration slot antenna is located equidistantly between a center of the first antenna element, a center of the second antenna element, a center of a third antenna element of the plurality of antenna elements, and a center of a fourth antenna element of the plurality of antenna elements, the third antenna element being adjacent to the first antenna element, and the fourth antenna element being adjacent to the second antenna element and the third antenna element.

18. The satellite of claim 14, wherein the plurality of antenna elements are patch antennas.

19. The satellite of claim 14, wherein the calibration slot antenna radiates electromagnetic energy to calibrate the plurality of antenna elements.

20. The satellite of claim 14, wherein the plurality of identical antenna modules further comprises a second antenna module and coupled to the first antenna module, wherein the calibration slot antenna radiates electromagnetic energy to calibrate the plurality of antenna elements and a second plurality of antenna elements of the second antenna module.

\* \* \* \* \*